United States Patent Office 2,719,305
Patented Oct. 4, 1955

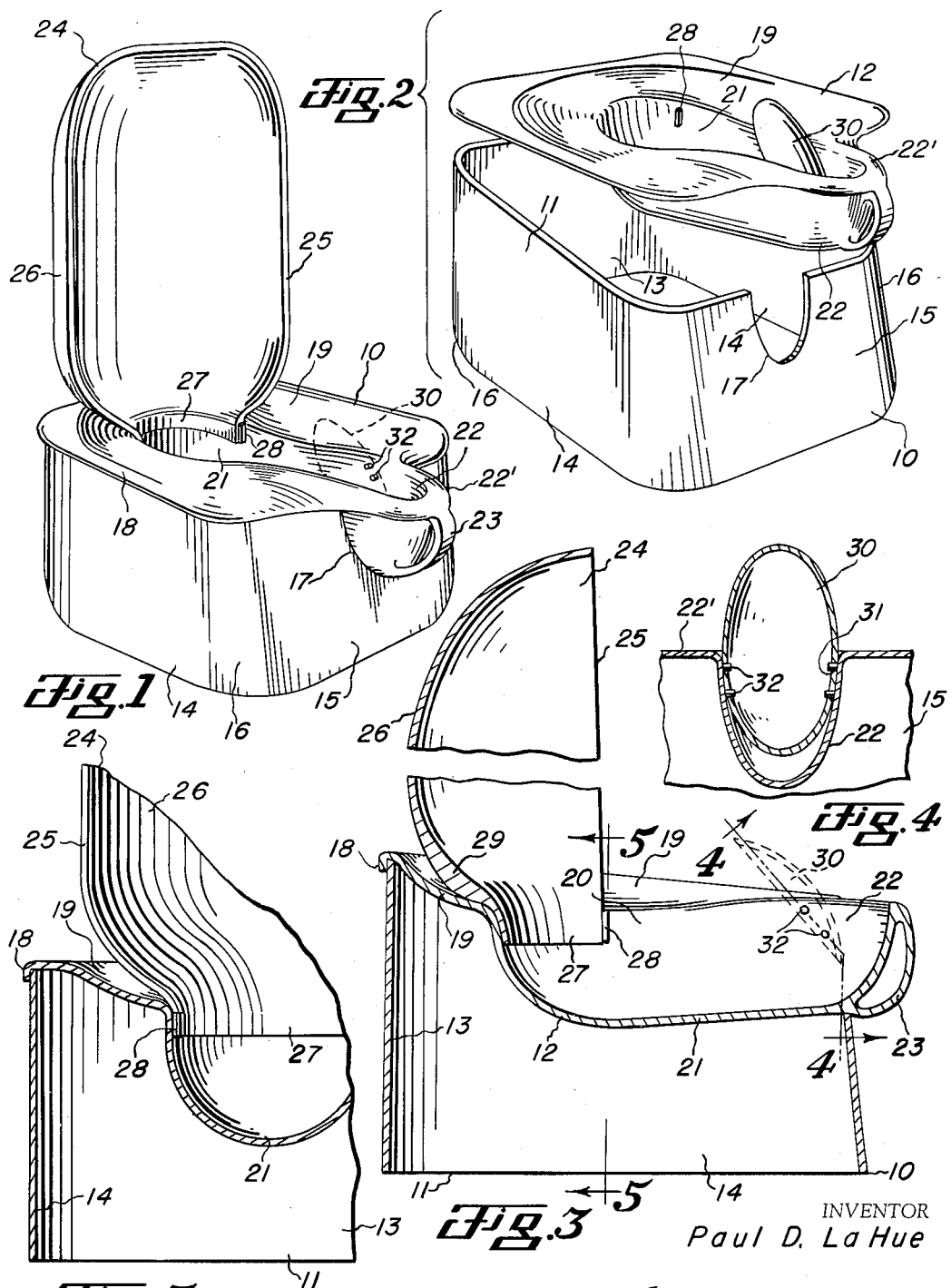

2,719,305

PORTABLE JUVENILE COMMODES

Paul D. La Hue, Dallas, Tex.

Application October 6, 1952, Serial No. 313,289

6 Claims. (Cl. 4—134)

This invention relates to new and useful improvements in portable juvenile commodes.

One object of the invention is to provide an improved portable commode especially designed for juveniles and having means for inducing desirable urinating habits.

Another object of the invention is to provide an improved juvenile commode embodying a base and a pan member removably mounted thereon, whereby the pan member is supported at a desirable elevation, the parts are separable and the base is open and readily cleansed.

An important object of the invention is to provide an improved juvenile commode having a combined bowl and seat member removably supported upon a base by its seat portion and equipped with a forwardly-directed handle to facilitate removal and emptying of said member.

A further object of the invention is to provide an improved commode having an upright shield detachably mounted on a pan member which shield is of sufficient height and is curvilinearly deep enough to properly function with a minimum of splashing.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective view of a commode constructed in accordance with the invention, Fig. 2 is an exploded perspective view of the commode with the urinal shell omitted, Fig. 3 is a longitudinal, vertical, sectional view of the commode, Fig. 4 is a transverse, vertical, sectional view, taken on the line 4—4 of Fig. 3, showing the mounting of the urinal guard, and Fig. 5 is a transverse, vertical, sectional view, taken on the line 5—5 of Fig. 3.

In the drawing, the numeral 10 designates a commode which includes an upright rectangular base or support 11 and a bowl or pan member 12 removably mounted upon the base. Preferably, the base 11 is continuous and has perpendicular back and side walls 13 and 14, an inwardly and upwardly inclined front wall 15 and an open top and bottom. Transversely rounded corners 16 connect the walls, and a curved notch or recess 17 is formed centrally in the upper edge of the front wall 15. In order to incline the bowl member 12 forwardly, the upper edges of the side walls 14 are inclined downwardly from the rear wall 13 to the front wall.

An angular flange 18 extends along the side and rear edges of the bowl member and has a depending, vertical portion overhanging the side and rear walls of the base and front end portions extending around the front corners 16, whereby said bowl member is held against displacement. Within its margin, the bowl member has an integral seat or sump 19 curved or inclined downwardly and inwardly and merging with the marginal wall 20 of a centrally-disposed, elongated bowl 21. It is noted that the horizontal portion of the flange 18 merges with the outer margin of the seat 19. The bowl 21 is substantially pear-shaped in plan and has a reduced forward extension or neck portion 22 fitting and resting in the notch 17 so as to protrude therefrom. An external handle 23 is formed integral with the front end of the bowl 21 and projects from its extension 22 so as to be disposed forwardly of the front wall 15. As shown by the numeral 18, the front end portions of the flange are curved downwardly and forwardly and project beyond and overhang the front wall. An external, rounded bead or lip 22' is formed at the upper edge portions of the extension between the handle 23 and the flange portions 18. As is best shown in Fig. 3, the bottom of the bowl inclines rearwardly so as to induce liquids to flow to the rear thereof.

From the foregoing it will be apparent that a two-piece commode has been provided which is readily separated and easily and fully cleaned. The continuous wall base, entirely open at top and bottom, may readily be immersed in water or water may be freely passed therethrough, whereby maximum cleansing is obtained. The bowl member 12 is easily removed from the base and emptied by pouring due to the provision of the handle 23. Also, the bowl member may be washed by immersion in water or a running stream. When separated, the two members have all surfaces and portions exposed for airing and drying to the best advantage.

In order to induce and make it convenient for a boy to urinate from a standing position, an upright shield or shell 24 may be provided and has a substantially vertical front edge 25 of a general rectangular shape with a deep curvilinear body 26 extending rearwardly from the front edge. The bottom of the shield 24 merges into an approximately semi-circular collar 27 which has a snug sliding fit in the rear of the bowl 21. Lugs 28 extend inwardly from the wall 20 of the bowl for engagement by the front edges of the collar 27. As shown by the numeral 29 (Fig. 3), the rear central portion of the shield is thickened immediately above the collar so as to rest upon the seat 19 and substantially support said shield. It is desirable to curve or round the upper and lower portions of the body 26.

A front splash guard 30 may be used, when desired, and is elliptical in shape and deeply dished. Below its center and on each side are a pair of apertures 31 for receiving pins 32 extending inwardly from the wall of the bowl extension 22. The pins 32 are so disposed as to cause the guard to incline upwardly and rearwardly and overhang the bowl. The guard is made of yieldable material so that its edge portions may be sprung onto and off of the pins. The guard, being readily placed in position and removed, may be used as desired.

The base 11 and bowl member 12 preferably are made of plastic but may be made of other suitable materials, such as metal or hard rubber. The shape of the shield 24 is advantageous and its body 26 is deep enough and sufficiently high to offer an adequate deflector when impinged by a small stream. The curvature of the shield greatly reduces splattering and is an improvement over the vertical shield shown in my Letters Patent No. 2,592,040, issued April 8, 1952. Terminating the shield at the upper edge portion of the bowl is desirable because it is less likely to become immersed in the contents of the bowl. Further when not in use, the shield may be easily removed. The most important feature of the invention resides in the bowl member and its ready removability. Manifestly, the forward projection of the handle 23 facilitates handling and emptying of the bowl member. In addition to providing a readily removable bowl or pan, a comfortable seat is combined with the bowl member. Also, the forward inclination of the seat is beneficial and conducive to correct use.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A juvenile commode including, an upright base member having a continuous upright wall and open at its top and bottom, a pan member having a laterally extending seat removably mounted on the base member and having an integral bowl depending from the seat into said base member, the upper edge of the base wall being inclined downwardly and forwardly and said seat resting directly upon said edge, the bowl of the pan member having its bottom inclined inwardly and downwardly and oppositely to the inclination of the upper edge of the base member.

2. A juvenile commode including, an upright base having a continuous marginal wall with a notch in the top of its front portion, a removable pan member having a laterally extending seat resting on the upper edge of the base wall and having a central elongate bowl depending from the seat into the base, the bowl having a neck resting in the notch of the base front wall and extending outwardly therethrough and therefrom, and a handle projecting forwardly from the neck to facilitate lifting of the pan member and emptying of the bowl.

3. A juvenile commode including, an upright marginal base having an upper edge and a front with an opening therein, a laterally extending seat removably supported upon the upper edge of the base, a bowl integral with the seat and depending therefrom longitudinally thereof and into the base, the forward end of the bowl being reduced transversely and protruding outwardly through the opening in the front of the base, and handle means exterior of the base on the protruding end of the bowl, the seat and bowl being removable from the base as a single unit.

4. A juvenile commode as set forth in claim 3, and an upright transversely bowed shell having a reduced lower end resting on the seat provided with a collar engaging in the rear portion of the bowl.

5. A juvenile commode as set forth in claim 3, and lugs in the forward reduced end of the bowl, and an upright splash guard mounted in the reduced end of the bowl and engaged on said lugs.

6. A juvenile commode including, an upright base having a marginal wall with a central notch in the upper edge of its front wall portion, a pan member having a margin resting upon the upper edge of the base wall and having a depending flange overhanging the outer face of said wall, a seat forming part of the pan member and concaved at its rear portion, a bowl depending longitudinally of the seat and extending rearwardly to the concaved portion of said seat, the bowl having a reduced portion at its front end snugly engaging in the notch of the wall and protruding therefrom, and handle means on the protruding end of the bowl, the pan member and seat and bowl being a unitary structure which may be bodily lifted from the base.

References Cited in the file of this patent

UNITED STATES PATENTS

| | | |
|---|---|---|
| D. 148,512 | Zuckerman | Jan. 27, 1948 |
| D. 168,463 | La Hue | Dec. 23, 1952 |
| 1,358,933 | Collins | Nov. 16, 1920 |
| 1,848,443 | Toops | Mar. 8, 1932 |
| 2,133,416 | Bentz | Oct. 18, 1938 |
| 2,307,897 | Overholser | Jan. 12, 1943 |
| 2,498,576 | Pourch | Feb. 21, 1950 |
| 2,544,792 | Jack | Mar. 13, 1951 |